United States Patent [19]
Fischman et al.

[11] 4,097,784
[45] Jun. 27, 1978

[54] QUADRUPOLE CONVERGENCE CIRCUIT

[75] Inventors: Martin Fischman, Seneca Falls; Jesse H. L'Hommedieu, Waterloo, both of N.Y.

[73] Assignee: GTE Sylvania Incorporated, Stamford, Conn.

[21] Appl. No.: 802,058

[22] Filed: May 31, 1977

[51] Int. Cl.² .................... H01J 29/70; H01J 29/76
[52] U.S. Cl. ............................. 315/368; 315/13 C
[58] Field of Search ................. 315/13 C, 368, 371

[56] References Cited
U.S. PATENT DOCUMENTS

| | | | |
|---|---|---|---|
| 3,821,591 | 6/1974 | Lister | 315/368 |
| 3,930,185 | 12/1975 | Barkow et al. | 315/13 C |
| 4,028,586 | 6/1977 | Mengle | 315/368 |

*Primary Examiner*—Maynard R. Wilbur
*Assistant Examiner*—T. M. Blum
*Attorney, Agent, or Firm*—Norman J. O'Malley; Thomas H. Buffton; Robert T. Orner

[57] ABSTRACT

In a color cathode ray tube deflection apparatus having a deflection yoke with horizontal, vertical and quadrupole windings and affixed to a color cathode ray tube, a quadrupole convergence circuit includes a quadrupole winding coupled to a source of substantially parabolic-shaped horizontal and vertical frequency signals and coupled by a signal clamping circuit which is, in turn, shunted by an impedance varying in proportion and an opposite direction to variations in the impedance of the clamping circuit as determined by the value of the substantially parabolic-shaped vertical frequency signal whereby convergence at the corners of a cathode ray tube is enhanced.

7 Claims, 4 Drawing Figures

QUADRUPOLE CONVERGENCE CIRCUIT

BACKGROUND OF THE INVENTION

In cathode ray tube apparatus and, in particular, color cathode ray tube apparatus, it is normal to employ a deflection yoke having horizontal, vertical and quadrupole windings. Also, it is a common practice to provide a quadrupole convergence circuit wherein horizontal and vertical frequency signals, which are substantially parabolic-shaped, are combined to control the electron beam deflection at the top and bottom, left and right of the viewing screen of the cathode ray tube.

Although quadrupole convergence circuits have been and still are utilized in numerous forms of cathode ray tube apparatus, it has been found that some of the better known forms of quadrupole convergence circuitry does leave something to be desired. More specifically, it has been found that one of the more popular forms of quadrupole convergence circuits has a horizontal frequency signal which tends to become modulated by the vertical frequency signal in an amount sufficient to cause undesired distortion and overconvergence at the corners of a rectangular-shaped inline color cathode ray tube for example.

In other words, it has been found that undesired interaction between the horizontal and vertical frequency signals utilized in the quadrupole circuitry of a convergence circuit tend to cause an undesired increase in magnitude of the substantially parabolic-shaped horizontal frequency signal whenever the amplitude of the vertical frequency increases. As a result, a substantially rectangular-shaped inline color cathode ray tube appears to be overconverged at the top and bottom corners of the display.

OBJECTS AND SUMMARY OF THE INVENTION

An object of the present invention is to overcome the above-mentioned problems associated with the prior art. Another object of the invention is to provide an enhanced quadrupole convergence circuit for an inline color cathode ray tube apparatus. Still another object of the invention is to improve the top and bottom left and right as well as the center convergence capabilities of a cathode ray tube apparatus employing a quadrupole convergence system. A further object of the invention is to improve the convergence capabilities of a quadrupole convergence system with a minimum increase in component and assembly costs.

These and other and further objects, advantages and capabilities are achieved in one aspect of the invention by a quadrupole convergence circuit wherein a quadrupole winding is coupled to a source of parabolic-shaped horizontal and vertical frequency signals, shunted by a clamping means having an impedance value which increases with an increasing magnitude of vertical frequency signal which is coupled to a means providing a compensating decreasing impedance magnitude with increasing amplitude of the vertical frequency signal.

PREFERRED EMBODIMENT OF THE INVENTION

For a better understanding of the present invention, together with other and further objects, advantages and capabilities thereof, reference is made to the following disclosure and appended claims in conjunction with the accompanying drawings.

Figure 1:
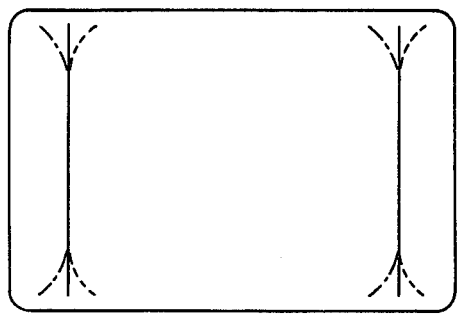
FIG. 1 is a diagrammatic illustration of an overconverged color cathode ray tube image display utilizing a quadrupole convergence circuit of the prior art.

Referring to the drawings, FIG. 1 illustrates a viewing screen of a cathode ray tube apparatus wherein overconvergence is prevalent at the corners of the viewing screen. In this illustration, commonly encountered in prior art forms of quadrupole convergence apparatus for inline cathode ray tube deflection systems, the top-bottom, left and right portions of the viewing screen are undesirably overconverged and appear as an undesired distortion of a viewed display.

Figure 2:
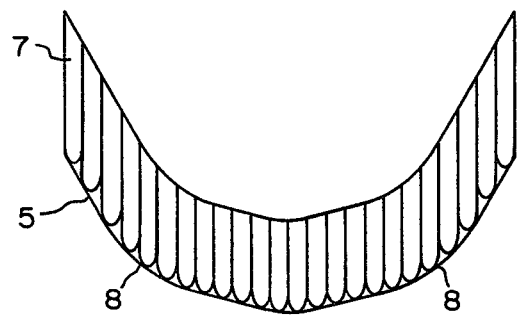
FIG. 2 is a diagrammatic illustration of the horizontal and vertical frequency waveform appearing at the quadrupole winding of a prior art form of quadrupole convergence circuit.

As to the cause for such undesired convergence distortion, reference is made to the prior art illustration of FIG. 2. Therein, a substantially parabolic-shaped waveform at a vertical scan frequency 5 is combined with a substantially parabolic-shaped waveform at a horizontal scan frequency 7. Although exaggerated for purposes of illustration, it can readily be seen that the magnitude of the waveform at a horizontal scan frequency 7 greatly increases in magnitude while the waveform at the vertical scan frequency increases in magnitude at a substantially normal rate. Unfortunately, this relatively large change in magnitude of the waveform at the horizontal scan frequency 7 tends to cause the above-mentioned undesired overconvergence at the top-bottom, left and right viewing areas of a cathode ray tube visual display. Moreover, so-called "breakpoints" 8, which occur due to a rapid change in diode conductivity, are readily apparent in the waveform derived from the prior art circuitry.

Figure 3:
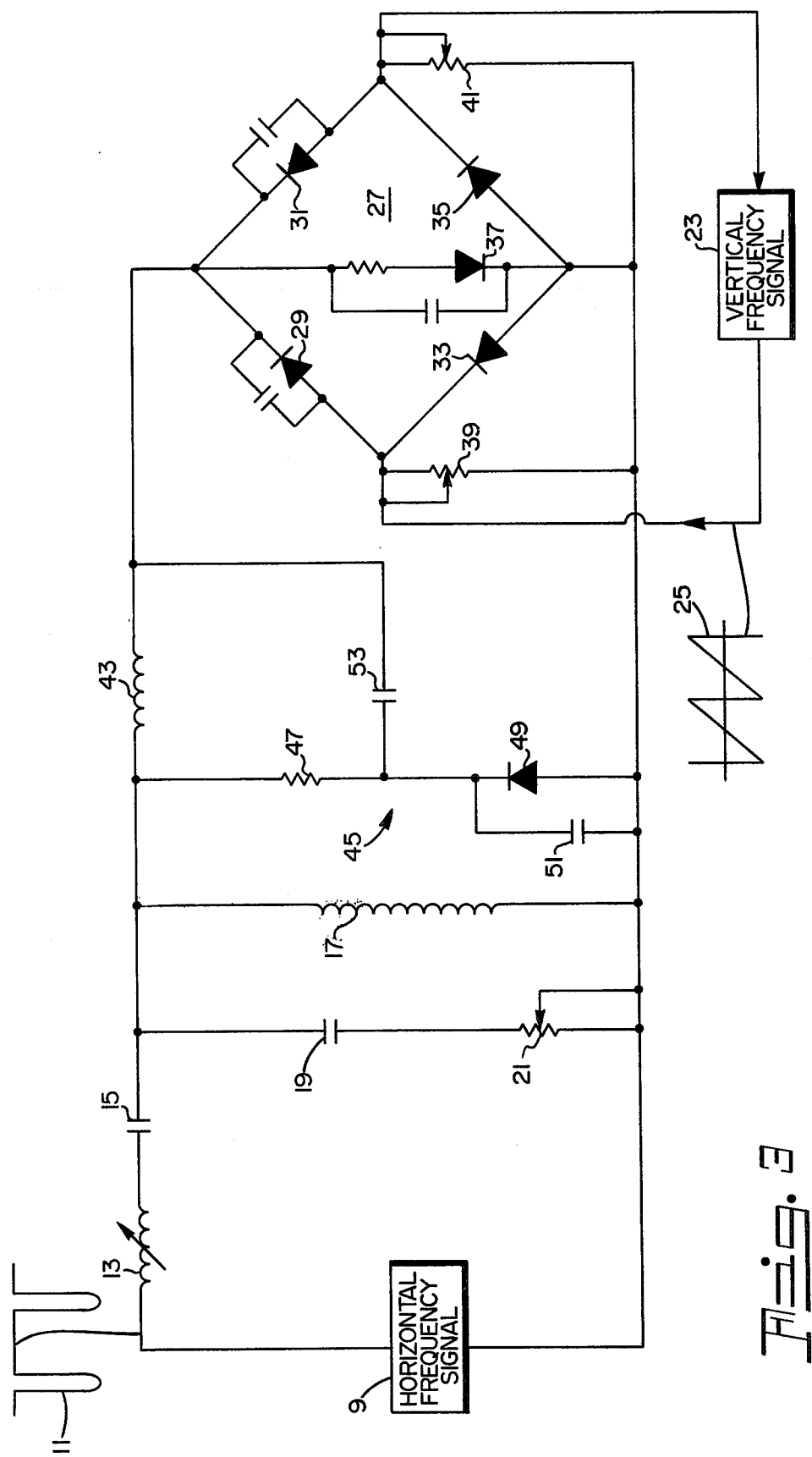
FIG. 3 is a preferred embodiment of a quadrupole convergence circuit for an inline color cathode ray tube display apparatus.

A quadrupole convergence apparatus for inhibiting such undesired overconvergence is illustrated in FIG. 3. Therein, a source of horizontal frequency signals 9, such as provided in a color television receiver for example, provides a pulse-shaped signal, waveform 11, which is applied to an adjustable inductor 13 coupled by a capacitor 15 to a quadrupole winding 17. A series connected capacitor 19 and adjustable resistor 21 shunt the quadrupole winding 17. Thus, the adjustable inductor 13 and resistor 21 in conjunction with the capacitors 15 and 19 serve as an integrating means for developing and controlling the shape of a substantially parabolic-shaped signal at a horizontal frequency which is applied to the quadrupole winding 17.

Also, a source of vertical frequency signals 23, such as provided in a color television receiver for example, provides a substantially sawtooth-shaped signal, waveform 25, to a full-wave rectifier bridge circuit 27. The bridge circuit 27 includes a plurality of diodes 29, 31, 33, 35 and 37 as well as a first adjustable resistor 39 coupled to the bridge circuit 27 and an input from the vertical frequency source 23 and a second adjustable resistor 41 coupled to the bridge circuit 27 and an output there-from to the vertical frequency signal source 23. The bridge circuit 27 is coupled by way of a choke 43 to the quadrupole winding 17.

A clamping means 45 includes a series connected resistor 47 and diode 49 shunted by a capacitor 51. The clamping means 45 is shunted across the quadrupole winding 17 and serves to clamp a substantially parabolic-shaped signal at a vertical deflection frequency being applied to the quadrupole winding 17 to a potential reference level.

Additionally, a capacitor 53 is connected to the junction of the series connected resistor 47 and diode 49 of the clamping circuit 45 and to the junction of the choke 43 and the full-wave rectifier bridge 27. Thus, the capacitor 53 and bridge circuit 27 are series connected and, in essence, shunt the diode 49 of the clamping circuit 45.

As to operation, a pulse signal at the horizontal deflection rate from the horizontal frequency source 9 is coupled via the inductor 13 and capacitor 15 and the capacitor 19 and resistor 21 to the quadrupole winding 17. The original pulse signal is substantially integrated and controlled by the adjustable inductor 13 and adjustable resistor 21 to provide a substantially parabolic-shaped horizontal frequency signal at the quadrupole winding 17.

Also, a substantially sawtooth-shaped signal from the vertical frequency source 23 is coupled to the full-wave rectifier bridge circuit 27. In turn, a substantially parabolic-shaped signal at the vertical deflection frequency is coupled via the choke 43 to the quadrupole winding 17. The choke serves to isolate the horizontal and vertical frequency circuits by acting as a relatively high impedance to horizontal frequency signals and a relatively low impedance to vertical frequency signals. Thus, the horizontal frequency signals are inhibited by the choke while the vertical frequency signals are not.

Further, the clamping circuit 45 tends to clamp the substantially parabolic-shaped vertical frequency signal to a potential reference level whenever the vertical frequency signal is at a minimum value. Moreover, when the vertical frequency signal is at a minimum value, the impedance of the diode 49 of the clamping circuit 45 is at a minimum value whereupon the horizontal frequency signal applied to the quadrupole winding 17 tends to have a given magnitude.

As the magnitude of the vertical frequency parabolic-shaped signal increases, the voltage on the clamping diode 49 increases which increases the impedance of the diode 49. As a result, the increased impedance of the diode 49 causes a disproportionate increased share of the horizontal frequency signal to flow into the quadrupole winding 17. Thus, the horizontal frequency signal in the quadrupole winding is undesirably modulated or disproportionately increased whenever the vertical frequency signal increases as illustrated in FIG. 2. Moreover, the undesired disproportionate increase in the horizontal frequency signal causes undesired distortion at the top-bottom, left-right portion of the viewing screen as illustrated in FIG. 1.

Figure 4:
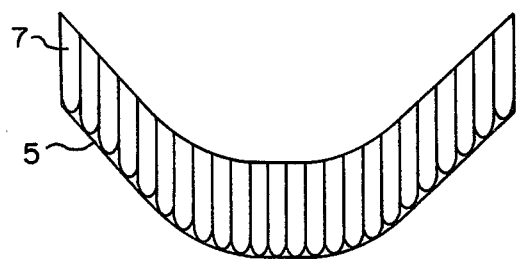
FIG. 4 is a diagrammatic illustration of the horizontal and vertical frequency waveforms appearing at the quadrupole winding of the quadrupole convergence circuit of FIG. 3.

However, by utilizing the capacitor 53 to couple the junction of the resistor 47 and diode 49 of the clamping circuit 45 to the bridge circuit 27, the capacitor 53 and bridge circuit 27 are essentially in series and in shunt connection with the diode 49 of the clamping circuit 45. Since the impedance of the bridge circuit 27 decreases and the impedance of the diode increases as the potential of the vertical frequency signal increases, the resultant impedance to the horizontal frequency signal remains substantially unchanged whereupon the magnitude of the horizontal frequency signal desirably remains substantially constant as illustrated in FIG. 4.

In other words, as the substantially parabolic-shaped vertical frequency signal, available from the bridge circuit 27, tends to reach a maximum value, the impedance of the diode 49 of the clamping circuit 45 tends to reach a maximum value. As a result, a decreased amount of the substantially parabolic-shaped horizontal frequency signal is shunted by the clamping circuit 45 and undesirably appears at the quadrupole winding 17. Thus, the substantially normal increase in magnitude of the substantially parabolic-shaped vertical frequency signal is accompanied by an undesirable and disproportionately large increase in the substantially parabolic-shaped horizontal frequency signal.

Since the above-mentioned conditions result in an undesired increased impedance magnitude of the clamping circuit 45 or diode 49, it can be readily understood that shunting the diode 49 by circuitry having a compensating decreased impedance magnitude with increasing vertical frequency signal will tend to cancel the impedance change of the clamping circuit 45 and result in a desired and substantially unchanged horizontal frequency signal magnitude. Obviously, the value of the shunt connected compensating circuit may be made such that either an increase or a decreased value of impedance is obtainable in accordance with either an undesired underconvergence or an overconvergence condition.

Although the above-described technique and apparatus utilized to provide a compensating decreasing impedance for the undesired increasing impedance of the clamping circuit with increasing vertical frequency signal magnitude is preferred, it is obvious that other methods are equally appropriate and applicable. For example, any impedance which varies in magnitude in accordance with changes in amplitude of the vertical frequency signal may be shunted across the diode 49 to provide the desired compensating impedance variations. One might use an amplifier device or a light emitting diode responsive to the vertical frequency signal magnitude for shunting the clamping diode to provide the desired substantially constant level of impedance and resultant horizontal frequency signal.

Additionally, it may be noted that it has been found that the potentials fed back to the bridge circuit 27 via the capacitor 53 occur when the impedance of the bridge circuit 27 is at a minimum. Since it is known that diodes have a "breakpoint" whereat conductivity thereof changes rather rapidly and that this "breakpoint" is at relatively low potential values, it has been found that the feedback potentials tend to "prime" or bias the diodes of the bridge circuit 27 and provide a much smoother transition or a much less pronounced "breakpoint" condition than that previously observed.

Thus, there has been provided a unique quadrupole convergence circuit especially suitable to color television receivers employing inline color cathode ray tubes. The circuit provides a desired reduced amount of convergence at the top-bottom, left-right corners of a viewing screen as compared with any other known circuit. Also, the circuitry enhances the operation of the bridge circuitry therein by providing a "primary" potential thereto whereby the "breakpoints" are smoothed and the resultant effect improved. Moreover, the circuitry is inexpensive of components and assembly time.

While there has been shown and described what is at present considered a preferred embodiment of the invention, it will be obvious to those skilled in the art that various changes and modifications may be made therein without departing from the invention as defined by the appended claims.

What is claimed is:

1. In a cathode ray tube deflection apparatus employing an inline color cathode ray tube and an affixed deflection yoke having horizontal, vertical and quadrupole windings coupled to horizontal and vertical frequency signal sources, a quadrupole convergence circuit comprising:

a quadrupole winding;

means for developing substantially parabolic shaped horizontal and vertical frequency signals coupled to said convergence winding;

means for clamping said substantially parabolic-shaped horizontal and vertical frequency signals coupled to said quadrupole winding, said clamping means having an increasing impedance value in response to an increasing value of said substantially parabolic-shaped vertical frequency signal; and means coupled to said clamping means and to said means for developing substantially parabolic-shaped vertical frequency signals, said means and said means for developing substantially parabolic-shaped vertical frequency signals combining to provide a compensating alteration in impedance value substantially proportional and opposite to the alteration in impedance value of said clamping means in response to an increasing value of said substantially parabolic-shaped vertical frequency signal whereby the magnitude of said substantially parabolic-shaped horizontal frequency signal is controlled.

2. The quadrupole convergence circuit of claim 1 wherein said means coupled to said clamping means is in the form of a capacitor coupled to said means for developing a substantially parabolic-shaped vertical frequency signal.

3. The quadrupole convergence circuit of claim 1 wherein said means for developing a substantially parabolic-shaped vertical frequency signal includes a rectifier bridge circuit coupling said vertical frequency signal source to said quadrupole winding and to said clamping means.

4. The quadrupole convergence circuit of claim 3 wherein said means coupled to said clamping means includes a series connected capacitor and rectifier bridge circuit coupled to a clamping diode and to said vertical frequency signal source.

5. A quadrupole convergence circuit for a color television receiver employing an inline color cathode ray tube and an attached deflection yoke having horizontal, vertical and quadrupole windings, said quadrupole convergence circuit comprising:

a source of horizontal frequency pulse signals;

a parabolic wave-shape developing circuit coupled to said source of horizontal frequency pulse signals;

a source of vertical frequency signals;

a parabolic wave-shape developing circuit coupled to said source of vertical frequency signals;

a quadrupole winding coupled to said parabolic wave-shape developing circuits coupled to said horizontal and vertical frequency signal sources;

a clamping circuit shunting said quadrupole winding; and means coupled to said clamping circuit to provide a compensating decrease in impedance value in response to an increase in impedance value of said clamping circuit whereby an undesired increase in magnitude of the parabolic-shaped horizontal frequency signal tending to occur at an increased value of parabolic-shaped vertical frequency signal is inhibited.

6. The quadrupole convergence circuit of claim 5 wherein said means coupled to said clamping circuit is in the form of an alterable impedance varying in proportion to variations in said source of vertical frequency signals.

7. The quadrupole convergence circuit of claim 5 wherein said parabolic wave-shape developing circuit coupled to said source of vertical frequency signals includes a rectifier bridge circuit and said means coupled to said clamping circuit includes a capacitor series connecting said clamping circuit to said rectifier bridge circuit.

* * * * *